United States Patent

Welch et al.

Patent Number: 5,706,994
Date of Patent: Jan. 13, 1998

[54] VACUUM ASSISTED WEB DRIVE FOR CORRUGATOR DOUBLE BACKER

[75] Inventors: Harold D. Welch, Phillips; Matthew A. Tourdot, McFarland; Paul A. Garvoille, Cambridge; Carl R. Marschke, Phillips, all of Wis.

[73] Assignee: Marquip, Inc., Phillips, Wis.

[21] Appl. No.: 670,812

[22] Filed: Jun. 25, 1996

Related U.S. Application Data

[62] Division of Ser. No. 494,327, Jun. 26, 1995, Pat. No. 5,561,918.

[51] Int. Cl.$^6$ .................................................. B65H 20/00
[52] U.S. Cl. ........................................ 226/95; 226/170
[58] Field of Search ................................ 226/95, 170

[56] References Cited

U.S. PATENT DOCUMENTS

| | | | |
|---|---|---|---|
| 3,140,030 | 7/1964 | Stewart | 226/95 |
| 3,199,448 | 8/1965 | Jaffa et al. | 226/95 X |
| 3,321,121 | 5/1967 | Nyberg et al. | 226/170 X |
| 3,425,610 | 2/1969 | Stewart | 226/95 |
| 4,294,540 | 10/1981 | Thettu | 226/95 X |
| 4,641,771 | 2/1987 | Masuch et al. | 226/95 X |
| 4,660,752 | 4/1987 | Rikard et al. | 226/95 |

*Primary Examiner*—Michael Mansen
*Attorney, Agent, or Firm*—Andrus,Sceales,Starke & Sawall

[57] ABSTRACT

A double backer for curing the web bonding adhesive and drying the corrugated paperboard web utilizes a web holddown apparatus for maintaining the web in intimate drying contact with the lower heating units which does not require the use of a driven holddown belt. The web is pulled through the double backer by a downstream vacuum conveyor section comprising a single belt or a series of transport belt sections to the upper surfaces of which a vacuum is applied. The vacuum drive belt may have portions which are unsupported between laterally spaced vacuum slots, supported on a reduced friction support surface, or supported by air bearings to reduce friction and drive power requirements.

10 Claims, 7 Drawing Sheets

VACUUM ASSISTED WEB DRIVE FOR CORRUGATOR DOUBLE BACKER

This is a divisional of application Ser. No. 08/494,327, filed Jun. 26, 1995, now U.S. Pat. No. 5,561,918.

BACKGROUND OF THE INVENTION

The present invention pertains to a double backer for the production of corrugated paperboard and, more particularly, to a double backer in which the conventional driven web holddown belt is eliminated and replaced with a unique vacuum traction device.

In a typical prior art double backer, a liner web is brought into contact with the glued flute tips of a single face corrugated web, and the freshly glued double face web is then passed over the surfaces of a number of serially arranged heating units, usually steam chests, to cause the starch-based glue to set and to drive moisture from the web. Double face web travel over the flat heated surfaces of steam chests is typically provided by a wide driven holddown belt in direct contact with the upper face of the corrugated web. The top face of the belt, in turn, is held in contact with the traveling web by any of several types of weight or force applying devices, well known in prior art. For example, the holddown belt may be engaged by a series of weighted ballast rollers, it may be forced into contact with the web by air pressure from a system of nozzles located over the web, or an arrangement of inflatable air bladders may be operated to press the moving holddown belt into contact with the double face web. It is also known to provide means for varying the ballast load applied to the holddown belt and web, both longitudinally in the machine direction and laterally in the cross machine direction.

The use of a driven holddown belt in a double backer has a number of attendant disadvantages. The holddown belt must be mounted for continuous travel in the manner of the conventional continuous conveyor belt system and, therefore, must also include a separate belt drive means. The holddown belt also must necessarily overlie the entire surface of corrugated web, at least in the heating section, and, as a result, may inhibit the escape of moisture from the board as it dries. Also, the edges of the belt which overhang the edges of the corrugated web run in contact with surfaces of the steam chests or other heating surfaces and are subject to wear.

SUMMARY OF THE INVENTION

A double backer is provided in which the driven holddown belt is eliminated. Stationary holddown strips, extending parallel to one another in the direction of web movement, are supported from above to contact the entire web across its width and along the heating section. A separate downstream vacuum assisted conveyor, in accordance with the present invention, is used to pull the corrugated web through the heating section.

The vacuum assisted conveyor apparatus includes a continuous web transport belt which underlies and supports the web across its lateral width, and means are provided for driving the belt. In its most basic embodiment, the vacuum assisted conveyor apparatus of the present invention may utilize a generally flat surface belt for the vacuum conveyor, which belt is provided with a series of openings to direct a vacuum applied from below to the corrugated web or other web being pulled by the belt. In the basic embodiment, the lower belt support structure may include a flat plate underlying the entire vacuum belt and provided with two patterns of holes, one comprising lines of vacuum openings aligned with the belt openings to apply vacuum air flow from plenums attached to the lower surface of the plate and a series of apertures between the vacuum openings to modulate or prevent the propagation of vacuum force against the underside of the belt. The belt may include spaced raised protrusions on the upper belt surface, which protrusions have flat surface portions defining a web contacting surface, said protrusions defining open channels therebetween. Openings in the belt provide communication between the lower belt surface and the upper belt surface, including the channels, if present. A vacuum source is operatively connected to the openings to supply negative pressure to the upper belt surface or the channels sufficient to hold the web to the moving belt.

In one embodiment, the raised protrusions comprise a series of discrete support elements, and the channels extend between the support elements both longitudinally and laterally over the belt. The channels are interconnected in this embodiment.

In a presently preferred embodiment, the channels in the web transport belt are defined by a series of laterally spaced raised longitudinal ribs. The ribs are continuous along the length of the belt and, thus, define continuous channels therebetween. The belt openings comprise laterally spaced lines of apertures, each of which lines of apertures is positioned within a channel.

The apparatus also includes a support structure which underlies the belt and provides sliding support for the driven belt. In one embodiment, the support structure includes a series of parallel laterally spaced support surfaces which extend the length of the conveyor, a longitudinal vacuum distribution slot in each support surface connected to the vacuum source, and the belt openings comprising a line of apertures aligned with each vacuum distribution slot. In this embodiment, each of the vacuum slots includes a recessed vacuum surface which is positioned below the support surface. A series of spaced vacuum openings is provided in the vacuum surface of each slot. Preferably, the support structure includes a vacuum plenum for each vacuum slot, and control means are provided for selectively connecting the vacuum source to each of said vacuum plenums.

Conveniently, pairs of corresponding plenums on opposite sides of the centerline are arranged so each pair is commonly controlled. The upper surface of the belt may include a gridwork of adjoining frame sections, each of which is defined by an enclosing rib having a flat outer surface coplanar with the web contacting surface portions of the protrusions, each frame positioned to be bisected by the longitudinal centerline of a support surface.

In the presently preferred embodiment of the invention, the support surface comprises a foraminous plate which includes a series of laterally spaced lines of vacuum openings, each of which lines of vacuum openings is aligned with certain of the openings in the belt. In the embodiment in which the channels are defined by a series of spaced, longitudinally extending ribs, a line of vacuum openings in the support plate is aligned with a line of apertures in the belt. In this embodiment, each line of vacuum openings in the support plate includes a vacuum plenum connected to the vacuum source. Appropriate control means are provided to selectively connect the vacuum source to each of said plenums, either individually or in similarly positioned laterally spaced pairs. In this embodiment, the support plate preferably includes patterns of air pressure equalization holes which are positioned between the vacuum openings in the plate and, by providing a controlled leakage of ambient outside air, prevent the propagation of vacuum across the entire underside of the belt.

The apparatus of the present invention is particularly adapted for moving a double face corrugated paperboard web through the heating section of a double backer, and the apparatus broadly comprises a web supporting conveyor belt positioned downstream of the heating section, means for driving the belt in the direction of web movement through the heating section, a belt support structure which includes a vacuum plenum and a vacuum source operatively connected to the plenum, and openings in the belt providing communication between a web contacting surface on the belt and the vacuum plenum. The belt includes a series of discrete raised support elements having flat surface portions which define the web contacting surface, with said support elements defining therebetween a network of open channels, and the openings extending through the belt and in communication with the channels. In the preferred embodiment, the support elements comprise laterally spaced longitudinally extending ribs. The belt may also be provided with a gridwork of adjoining frame sections which extend longitudinally and laterally thereover, the longitudinally extending frame sections defining a plurality of rows, each frame section defined by an enclosing rib which has a flat outer surface coplanar with the flat surface portions of the raised support elements, and wherein the openings comprise laterally spaced lines of apertures which extend along the belt, each line of apertures positioned to bisect a row of frame sections.

In another embodiment, the vacuum conveyor includes a plurality of laterally spaced parallel belt sections, means to drive the belts, and a vacuum source operatively connected to the transport surfaces of the belts. Each vacuum belt section may include laterally extending (cross machine direction) ribs having flat face portions defining the web contacting surface and channels therebetween defining the vacuum openings at their ends. The vacuum source is operative to supply negative pressure to longitudinally extending (machine direction) spaces between the belt sections, which spaces are positioned in open communication with the channels in the surface of the belt to distribute the vacuum uniformly over the undersurface of the web. The apparatus may also include a source of pressurized air operatively connected to the underside of belt sections to provide belt supporting air bearings.

DETAILED DESCRIPTION OF THE PREFERRED EMBODIMENTS

Figure 1:
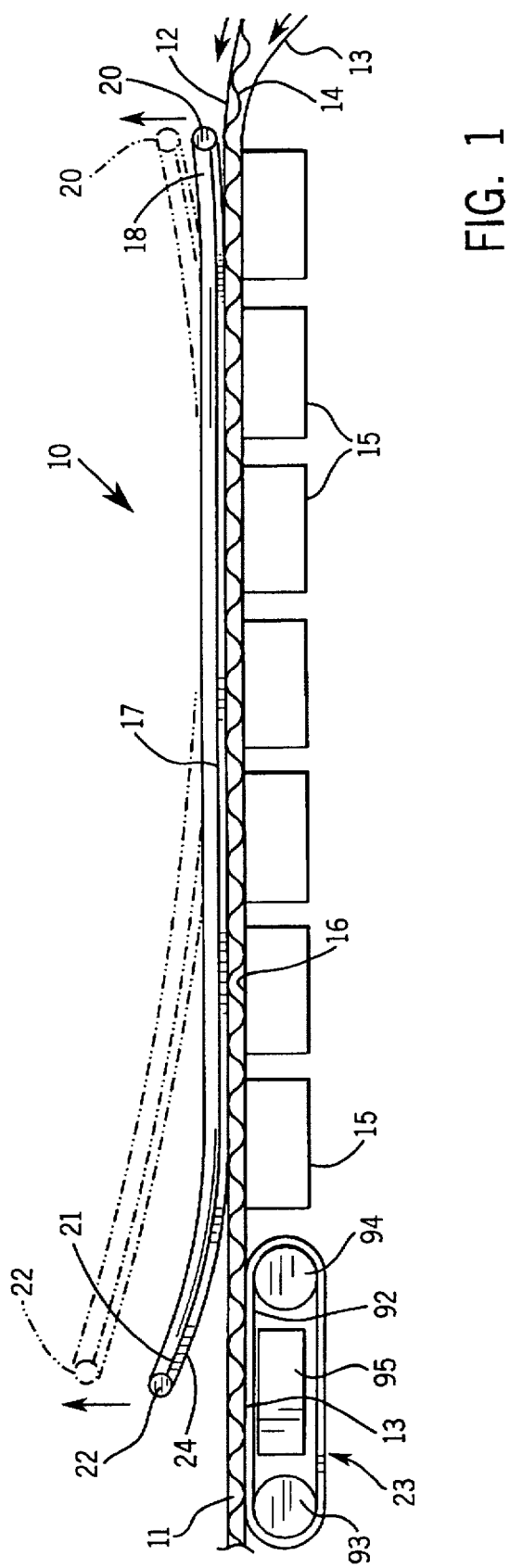
FIG. 1 is a side elevation of double backer showing schematically the web drive of one embodiment of the present invention.
Figure 2:
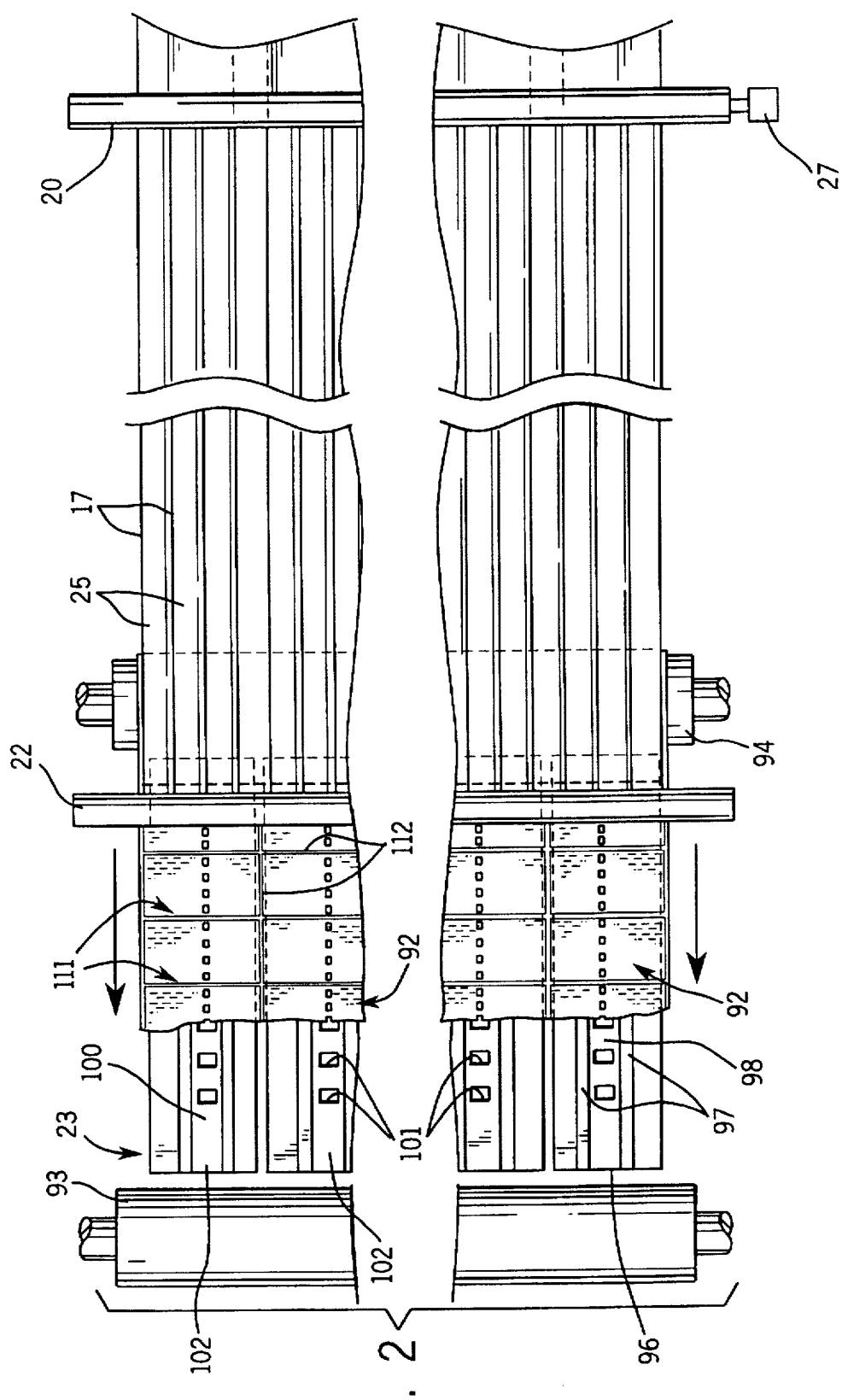
FIG. 2 is a top plan view of FIG. 1.

Referring initially to FIGS. 1 and 2, there is shown in generally schematic form a double backer 10 including web drive of one embodiment of the invention. In the double backer, a double face corrugated web 11 is formed by joining a single face corrugated web 12 and a liner web 13. The glue tips of the corrugated medium 14 of the single face web 12 are covered with a starch-based adhesive in an upstream glue machine (not shown) and the adhesive bond between the glue tips and the liner 13 is cured by the application of heat and pressure in the double backer 10.

Heat is supplied by a series of heating units 15 having flat, coplanar heating surfaces 16 over which the web 11 travels through the double backer. The heating units typically comprise individual steam chests which are fabricated of a heavy-walled cast iron or steel construction, but may as well comprise any suitable flat heated surface. Each steam chest has an open interior to which high pressure steam is supplied in a known manner and utilizing a supply system which is not shown in the drawings. Each heating unit 15 may be 18 to 24 inches (about 45–60 cm) in length (in the direction of web movement) and have a width in the cross machine direction sufficient to fully support the maximum width of corrugated web to be processed, e.g. 96 inches (about 245 cm). The total length of the heating section provided by a series of heating units may be, for example, 30 feet (approximately 9 m).

A series of flexible parallel metal strips 17 is suspended above the heating section in a manner such that the sag or catenary in the strips allows them to lie atop the double face web 11 and provide the holddown force necessary to facilitate uniform heating and drying of the web and curing of the adhesive. The strips 17 may, for example, be made of stainless steel with a width of 1 inch (about 2.5 cm) or greater and a thickness of 0.040 inch (about 1 mm). A sufficient number of strips must be utilized to provide an overall holddown width in the cross machine direction sufficient to cover the full width of web being processed. The strips are preferably mounted to be quite closely spaced so that substantially full coverage of the web 11 is provided. The upstream ends 18 of the strips are attached to a common upstream support 20 and the downstream ends 21 are attached to a common downstream support 22.

In the FIG. 1 embodiment, the upstream support 20 is positioned just upstream of the upstream-most heating unit 15 just above the incoming single face and liner webs 12 and 13. In this manner, there is only a very short catenary portion which sags downwardly under the influence of gravity and is not in contact with the web 12 in the heating section. The downstream support 22 may extend a greater distance downstream of the downstream-most heating unit 15 to a point over the web drive conveyor 23, to be described in greater detail hereinafter. The downstream support 22 may also be positioned at a somewhat elevated position with respect to the upstream support 20, such that a downstream catenary portion 24 does not contact the web along the drive conveyor 23. Either or both of the strip supports 20 and 22 may be mounted for adjustable vertical movement, as indicated by the arrows in FIG. 1. By raising one or both of the supports, the respective ends 18 and 21 of the strips may also be raised to vary the length of the strips resting upon and in contact with the double face web 11. In this manner, the amount of heat transferred to and the amount of holddown force imposed upon the moving double face web 11 may be adjusted as desired.

Figure 3:
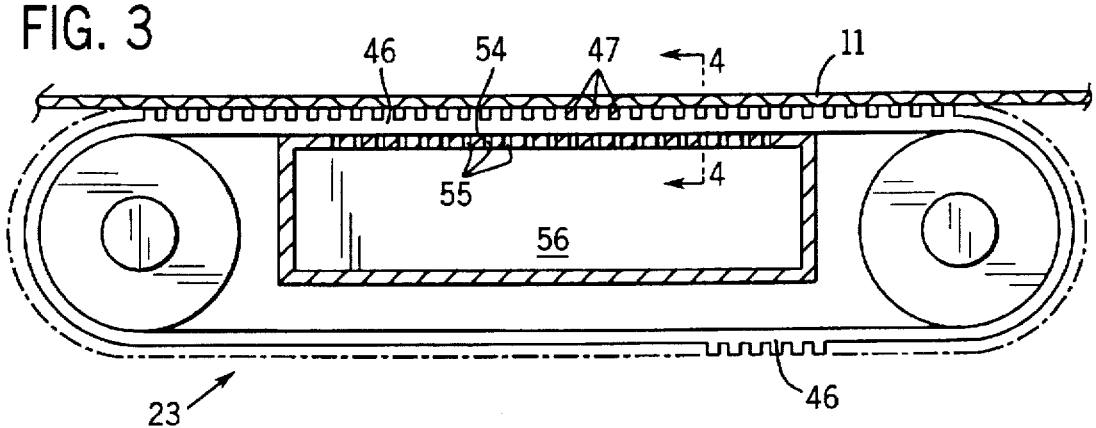
FIG. 3 is a side elevation of one embodiment of the drive conveyor of the present invention.
Figure 4:
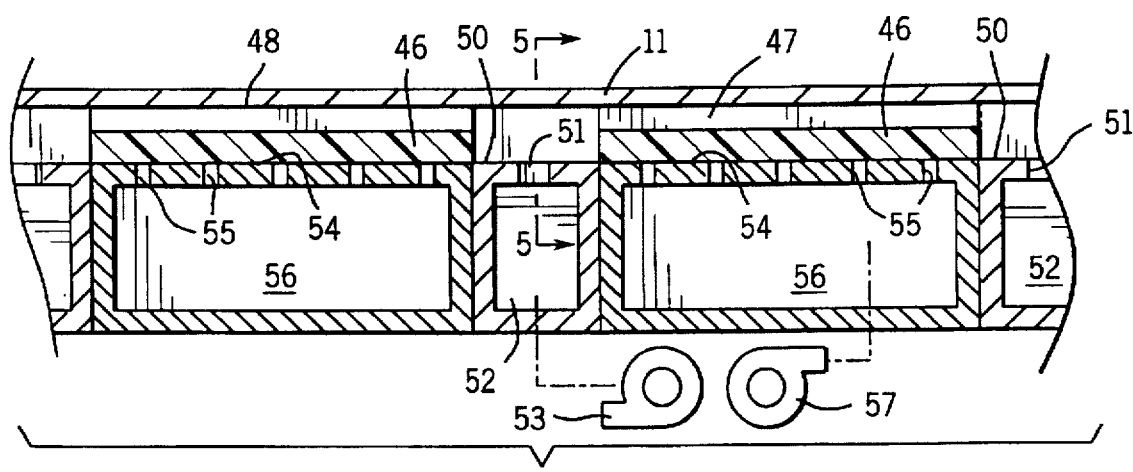
FIG. 4 is a partial sectional view taken on line 4—4 of FIG. 3.
Figure 5:
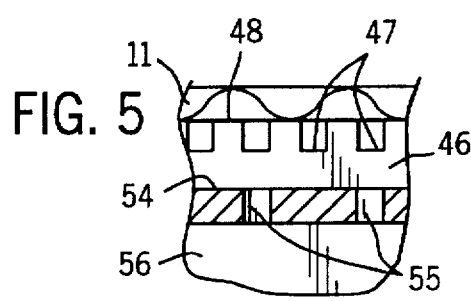
FIG. 5 is a partial sectional view taken along line 5—5 of FIG. 4.

FIGS. 3–5 show details of the construction and operation of one embodiment of the drive conveyor 23 which may be used with the previously described double backer. The drive conveyor comprises a series of parallel, laterally spaced transport belt sections 46. The drive surface of each belt section 46 is ribbed to define laterally extending grooves or channels 47 between generally flat topped web supporting crowns 48. The spaces between adjacent vacuum belts 46 are defined by a series of shallow slots 50, the bottom surfaces of which are provided with a line of vacuum supply holes 51. The slots 50 provide open communication between the grooves 47 in the transport belts and the vacuum supply holes in the slots which define the upper surfaces of a series of vacuum plenums 52. The vacuum plenums are connected to a suction blower 53 to provide the required negative pressure. With the traveling double face web 11 in contact with the crowns 48 in the transport belts, the negative pressure is distributed evenly through the channels 47 and across the whole width of the web. If the web being processed is narrower than the full width of the vacuum drive conveyor 23, appropriate valving can be utilized to shut off the vacuum supplied to the vacuum slots 50 laterally outside the outer edges of the web.

The transport belt sections 46 operate over and in sliding contact with belt support surfaces 54 between the vacuum slots 50. In order to reduce sliding friction and corresponding drive power requirements, the transport belts may be operated upon air bearings formed between the support surfaces 54 and the flat undersides of the belts 46. Thus, the surfaces 54 may be provided with air supply holes 55 through which pressurized air from lower air plenums 56 is supplied to provide the air bearing support. In order to provide an adequate air bearing support, the positive air pressure supporting the belts must be greater than the negative pressure supplying the holddown force for the corrugated web. A second blower 57 may be used to provide the positive air pressure for the air bearings. As shown schematically in FIGS. 3 and 5, the vacuum plenums 52 are suitably connected to the suction side of blower 53, while the air plenums 56 are operatively connected to the outlet of blower 57.

The vacuum assisted web drive 23 of another embodiment is shown somewhat schematically in the top plan view of FIG. 2 and additional details are shown in FIGS. 6–10. In this embodiment, a single web transport belt 92 operates around a driven head pulley 93 and an idler tail pulley 94. Between the pulleys 93 and 94, the belt is carried on a support structure 95 which includes a vacuum plenum arrangement somewhat similar to the previously described embodiment.

Figure 6:
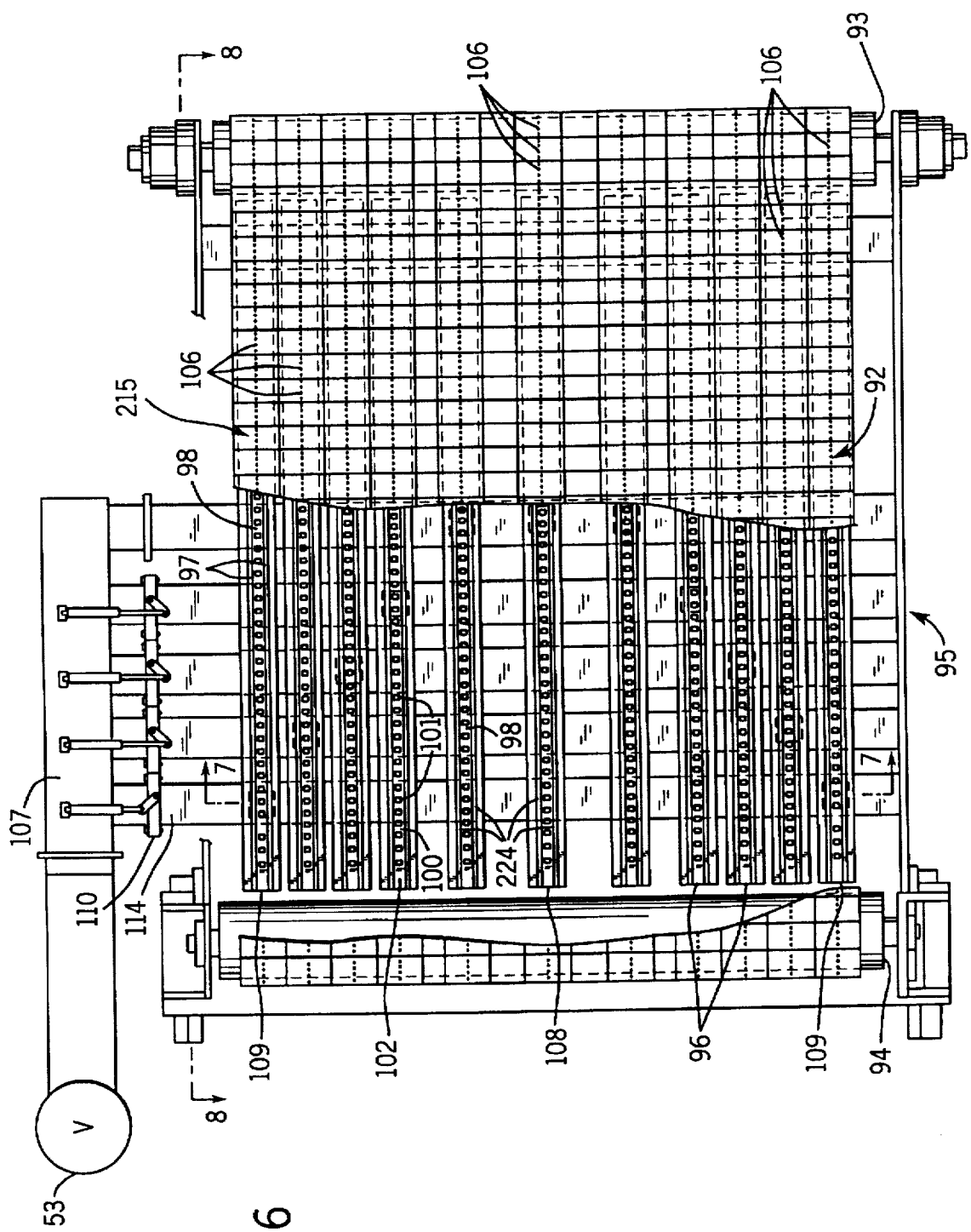
FIG. 6 is a detailed top plan view of the embodiment of the web drive apparatus at the downstream end of the double backer shown in FIG. 2.
Figure 7:
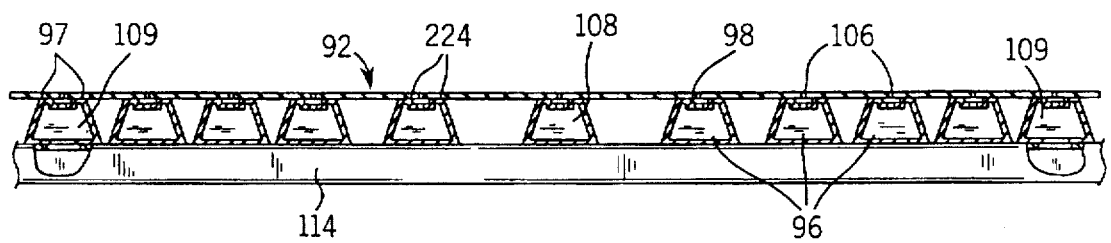
FIG. 7 is a sectional end view taken on line 7—7 of FIG. 6.
Figure 9:
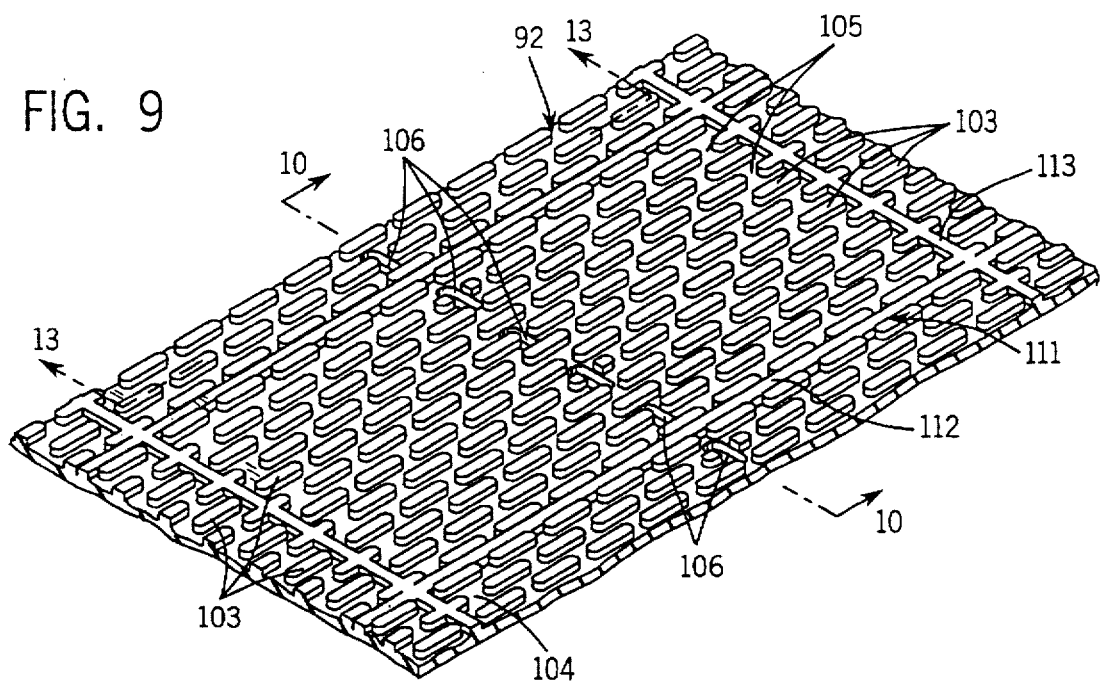
FIG. 9 is a perspective view of a section of the web transport belt of FIG. 6 showing details of its construction.
Figure 10:
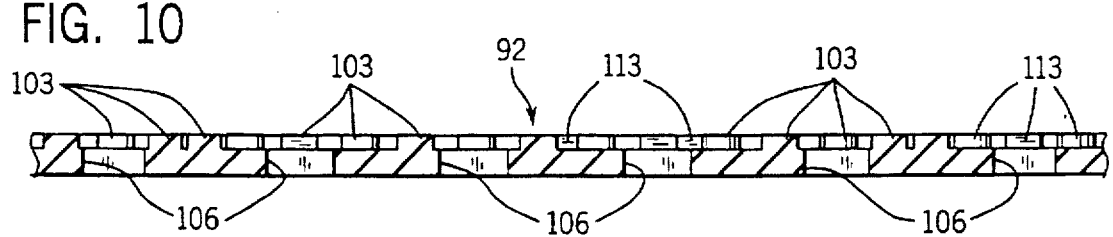
FIG. 10 is a sectional view taken on line 10—10 of FIG. 9.

With reference particularly to FIGS. 6 and 7, the support structure 95 includes a series of longitudinally extending and laterally spaced vacuum plenums 96. The uppermost surface of each plenum provides a support surface 97 for the belt 92. The plenums 96 and support surfaces 97 provided by the plenums extend nearly the full distance in the machine direction between the head and tail pulleys 93 and 94.

Centered in each plenum support surface 97 and running nearly the full length thereof is a recessed vacuum distribution slot 98. The bottom of the slot 98 is defined by a plate 100 provided with a series of spaced vacuum openings 101. The openings 101 provide direct communication to the interior of the plenum 96.

The vacuum slots 98 do not run the full length of the support surface 97, but rather are closed on the upstream and downstream ends with end plates 102. The end plates lie coplanar with the support surface 97 and provide additional support for the belt 92 which travels thereover. The end plates 102 also prevent or minimize vacuum loss from the ends of the vacuum slots. By placing the vacuum openings 101 in the bottoms of the recessed distribution slots 98, the holddown force provided by the vacuum is better distributed through the belt 92 as will be described.

The bottom of the web transport belt 92 is essentially flat. The upper surface of the belt, however, is specially configured to support the double face web 11 and to evenly distribute and control the loss of the vacuum applied to the under surface of the web. Specifically and referring also to FIGS. 9 and 10, the top surface of the belt (as the belt moves through its horizontal active conveying run) is provided with a pattern of discrete upstanding support elements 103. In the embodiment shown, the support elements are of a generally oblong shape in the cross machine direction. The tops of the elements are flat, lie in a common plane, and provide a web contacting surface upon which the lower liner 13 of web 11 is directly supported (see, for example, FIG. 1). The base surface 104 of the belt and the sides of the support elements 103 define an interconnected network of channels 105 through which the vacuum is distributed to the entire underside of the web 11 resting on the surfaces of the support elements 103.

The belt is provided with laterally spaced lines of apertures 106, each of which lines extends the full length of the belt, and overlies and is aligned with a vacuum distribution slot 98. Thus, as the belt 92 travels over the support surfaces 97 provided by the plenums, vacuum force will constantly be applied through the apertures 106, distributed throughout the network of channels 105, and provide a uniform holddown force for the web 11.

Figure 8:
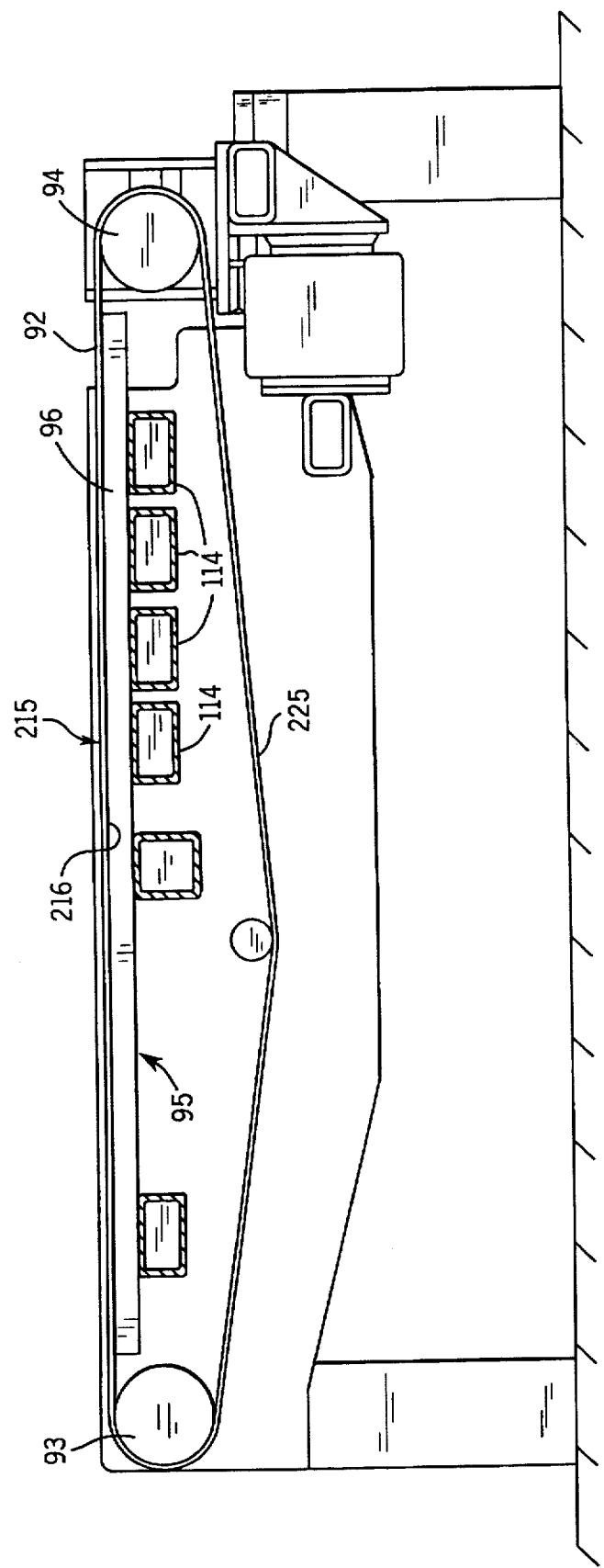
FIG. 8 is a sectional side view taken on line 8—8 of FIG. 6.

As is best shown in FIGS. 6 and 8, the apparatus of the present invention includes means for controlling the application of vacuum to the vacuum plenums 96 and to selectively seal off lateral portions of the belt surface to accommodate webs of varying widths and at the same time avoid the loss of or need to use excessive negative vacuum pressure. A vacuum distribution header 107 is used to supply negative pressure to the vacuum plenums 96 from a suction blower 53. Preferably, the system includes an odd number of vacuum plenums, including a central plenum 108 on the longitudinal centerline of the system and pairs of corresponding plenums on opposite sides of the centerline, each of which pairs is progressively more distant from the central plenum 108. See for example outermost plenum pair 109, as shown in FIGS. 6 and 7. In this manner, as a centered paperboard web 11 of a narrower width is being processed, pairs of plenums may be progressively shut off laterally inwardly from the outermost pair so that vacuum is only being applied to those plenums over which the web is traveling. As may be seen best in FIG. 6, the system is arranged such that a single control valve 110 controls the supply of negative pressure to one pair of plenums 96 supplied by a common vacuum lateral 114 connected to the header 107.

In order to prevent excess negative pressure loss, either via the lateral edges of the web or longitudinally as the belt wraps around the head or tail pulleys 93 or 94, the belt surface may be provided with a gridwork of adjoining frame sections 111. Each frame section is defined by an enclosing rib 112 projecting above the base surface 104 of the belt and having a flat outer surface 113 which lies coplanar with the web contacting surfaces of the support elements 103. The frame sections 111 are positioned in the longitudinal direction to be centered on a line of belt apertures 106. The vacuum applied to a line of apertures 106 from the plenum 96 directly below will thus be confined to the row of frame sections 111, assuming the sections are covered by a portion of the web.

On the other hand, it has been found that elimination of the ribs 112 and frame sections 111 which the ribs define may provide a beneficial cooling of the web being processed. This is because ambient air will be more readily drawn into the network of channels 105 on the belt surface 92 if there is no blocking obstruction of the frame sections 111. However, the energy requirements to generate additional compensating vacuum pressure may be increased.

Figure 11:
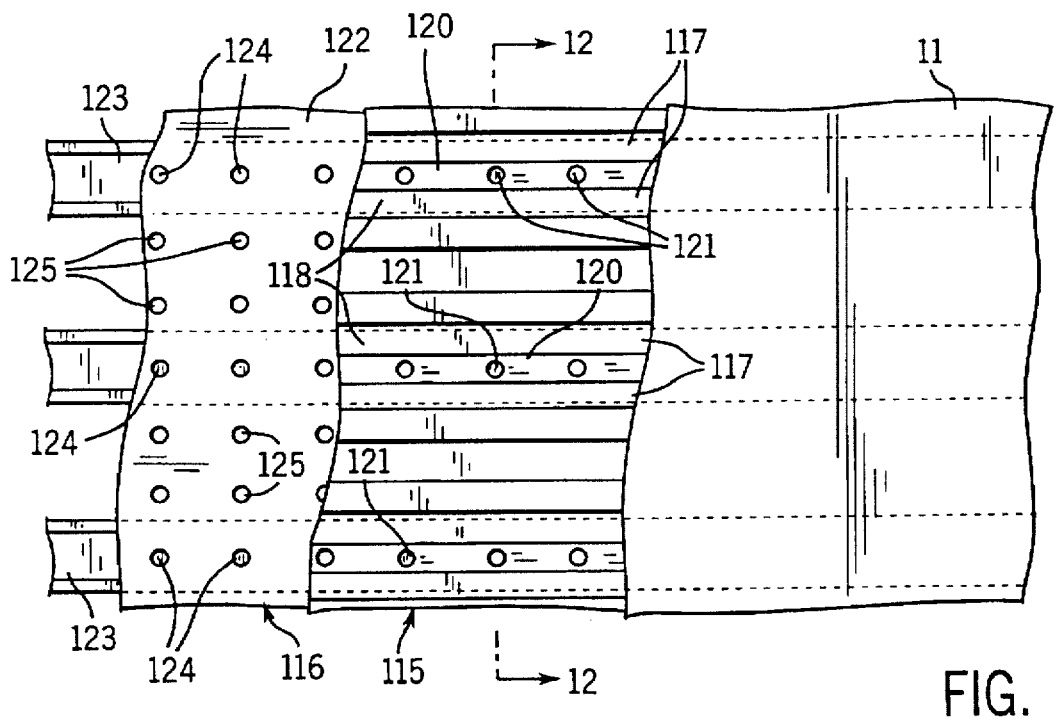
FIG. 11 is a top plan view of a section of a web transport belt and supporting structure of the presently preferred embodiment with portions broken away for clarity.
Figure 12:
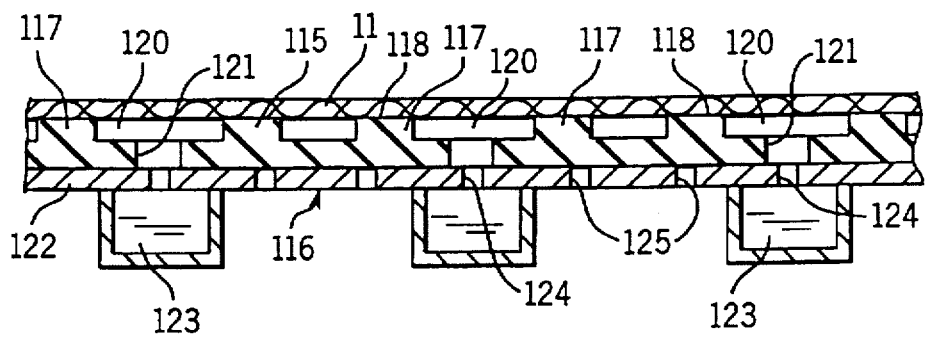
FIG. 12 is a vertical section taken on line 12—12 of FIG. 11.

In FIGS. 11 and 12, there is shown the presently preferred embodiment of a web transport belt 115 and belt support structure 116. The belt may be driven and carried by the same pulley arrangement previously described. In this embodiment, the web transport belt 115 is provided on its upper surface with a series of laterally spaced raised longitudinal ribs 117, each of which is continuous along the full length of the belt. The ribs have flat surfaces 118 which are coplanar and define a contacting surface for supporting the web.

Alternate adjacent pairs of ribs 117 are relatively closely spaced to define therebetween longitudinal channels 120. In each channel, the belt is provided with a line of apertures 121 which provide open communication through the belt to the lower surface thereof. The belt support structure 116 comprises a flat metal plate 122 which provides sliding support for the belt 115 traveling over it. The underside of the plate 122, in alignment with each of the channels 120 formed on the belt surface, includes a vacuum plenum 123. The plate 122 is provided with a line of vacuum openings 124 along the length of each vacuum plenum 123, which vacuum openings are aligned during belt movement with the line of apertures 121 in the belt. Thus, vacuum applied to the vacuum plenum 123 (in generally the same manner described with respect to the embodiment of FIGS. 6–10) will be applied to the belt channel 120 via the apertures 121 and will provide a holding and drive force to the double face corrugated web 11 supported on the flat surfaces 118 of the ribs 117. The ribs 117 confine the vacuum pressure to the channels and help seal the channels against entry of excessive air at ambient pressure. As in the previously described embodiment, the vacuum source may be connected to the plenums 123 to provide selective application of negative pressure to laterally spaced pairs of plenums or in any other convenient arrangement.

The longitudinal belt ribs 117 are more widely spaced between the channels 120 and, in the supporting plate 122 which underlies these intermediate portions of the belt, the plate is provided with a pattern of vacuum force dissipation holes 125. These vacuum dissipation holes extend through the plate and are open to ambient air beneath the plate and between adjacent vacuum plenums 123. The use of a flat metal plate 122 for the belt support structure requires some means to dissipate the propagation of vacuum force from the vacuum openings 124 under the belt 115. The flat interface between the underside of the belt 115 and the upper surface of the plate 122, adjacent the respectively aligned belt apertures 121 and vacuum openings 124, will not provide a complete seal to prevent the vacuum force from being undesirably applied to the belt as well as being desirably applied to the web 11. Thus, the vacuum dissipation holes 125 in the supporting plate 122 provide a controlled ambient air leakage which could otherwise impose an intolerable vacuum force on the belt. In the previously described embodiment (FIGS. 6–10) the regions between the plenums where the belt is unsupported provide the same effective relief from vacuum force. The controlled leakage of air provided by the vacuum dissipation holes 125 in the supporting plate 122 may require some increase in the size of the vacuum supply (e.g. blower 53 in FIG. 6). The same principle which results in propagation of the vacuum force to the underside of the belt 115, if no relief is provided, can be utilized to hold the web 11 to the upper surface of the belt without the need to use special raised ribs or protrusions. In other words, the upper belt surface may be flat and provided with lines of openings or apertures 121 without the need for confining ribs. The vacuum will nonetheless be distributed quite uniformly over the underside of the web allowing the same to be pulled through the system. Again, some upsizing of the vacuum source may be required. If necessary, it is even possible to provide the underside of the foraminous support plate 122 with a source of positive pressure to provide an air bearing effect such as previously described with respect to the embodiment of FIGS. 3–5. The vacuum openings 124 and the vacuum dissipation holes 125 are all preferably circular and of the same diameter for convenience of manufacture.

We claim:

1. A vacuum assisted conveyor apparatus for moving a web of material comprising:
   a continuous web transport belt having an upper belt surface underlying and supporting the web across the lateral width of said web;
   means for driving said belt;
   said belt including spaced raised discrete protrusions on the upper belt surface having flat surface portions defining a web contacting surface, said protrusions defining therebetween open channels extending between said support elements in the longitudinal and lateral directions of the belt;
   laterally spaced lines of longitudinally extending openings in said belt providing communication between a lower belt surface and said channels;
   a gridwork of adjoining frame sections in the upper surface of the belt, each section defined by an enclosing rib having a flat outer surface coplanar with the web contacting surface portions of said protrusions;
   each frame including a portion of a line of belt openings; and,
   a vacuum source operatively connected to said openings to supply negative pressure to said channels.

2. An apparatus for moving a double face corrugated paperboard web through a heating section of a double backer comprising:
   a web supporting conveyor belt positioned downstream of the heating section;
   means for driving said belt in the direction of web movement;
   a belt support structure under said belt including vacuum plenum means and a vacuum source operatively connected to said plenum means;
   openings in said belt providing vacuum air flow communication between a web contacting surface on said belt and said plenum means;

a series of discrete raised support elements on said belt having flat surface portions defining said web contacting surface, said support elements defining therebetween a network of open channels;

said openings extending through the belt and in communication with said channels;

a gridwork of adjoining frame sections on said belt extending longitudinally and laterally thereover, the longitudinally extending frame sections defining a plurality of rows;

each frame section defined by an enclosing rib having a flat outer surface coplanar with the flat surface portions of said raised support elements; and, said openings comprising laterally spaced lines of apertures extending along the belt, each line of apertures positioned to bisect a row of said frame sections.

3. The apparatus as set forth in claim 2 wherein said vacuum plenum means includes a vacuum plenum for each row of frame sections; and, control means for selectively connecting the vacuum source to each of said vacuum plenums.

4. A vacuum assisted conveyor apparatus for moving a web of material comprising:

a continuous web transport belt underlying and supporting the web across its lateral width;

means for driving said belt;

said belt having flat surface portions on the upper belt surface defining a web contacting surface, said surface portions defining therebetween open channels;

laterally spaced lines of longitudinally extending openings in said belt providing communication between the lower belt surface and said channels;

a support structure underlying said belt and providing sliding support for the driven belt;

said support structure including a series of parallel laterally spaced vacuum plenums defining belt support surfaces extending the length of the conveyor;

longitudinal vacuum distribution means in each support surface connected to said vacuum source;

one of said lines of belt openings aligned with each vacuum distribution means;

a vacuum source operatively connected to said plenums to supply negative pressure to said channels;

said plenums arranged in cooperating plenum pairs, each plenum in, a pair positioned on the opposite side of and equally spaced from the centerline of said belt with each of said pairs progressively more distant therefrom; and, control means for selectively connecting the vacuum source to only those of said plenum pairs over which the web centered on said centerline is traveling.

5. The apparatus as set forth in claim 4 wherein the plenums of pairs furthest from said centerline are more closely spaced to adjacent plenums than plenums of pairs closest to said centerline.

6. The apparatus as set forth in claim 4 wherein the total area of the belt support surfaces comprises less than about 25% of the total area of the support structure underlying said belt.

7. The apparatus as set forth in claim 4 wherein said surface portions comprise raised protrusions defining a series of discrete support elements, and said channels extend between said support elements in the longitudinal and lateral directions of the belt.

8. The apparatus as set forth in claim 7 wherein said channels are interconnected.

9. The apparatus as set forth in claim 4 wherein each of said vacuum distribution means comprises a slot defining a recessed vacuum surface positioned below the vacuum plenum support surface.

10. The apparatus as set forth in claim 9 including a series of spaced vacuum openings in the vacuum surface of each slot.

* * * * *